United States Patent [19]
Lamm

[11] 3,799,035
[45] Mar. 26, 1974

[54] ROTATING PISTON ENGINE

[76] Inventor: August Uno Lamm, 365 Moseley Rd., Hillsborough, Calif. 94010

[22] Filed: June 21, 1970

[21] Appl. No.: 264,807

Related U.S. Application Data

[63] Continuation of Ser. No. 878,637, Nov. 21, 1969, abandoned.

[52] U.S. Cl..................... 91/493, 417/462, 123/44
[51] Int. Cl............................................ T01b 13/04
[58] Field of Search...... 91/493, 496; 417/467, 462; 92/54, 58; 123/44, 44 P

[56] References Cited
UNITED STATES PATENTS

| | | | |
|---|---|---|---|
| 883,271 | 3/1908 | Wilson | 417/462 |
| 1,611,348 | 12/1926 | Hawkins | 91/493 |
| 1,897,190 | 2/1933 | Eyston | 417/462 |
| 1,910,876 | 5/1933 | Appel | 417/462 |
| 2,561,808 | 7/1951 | McCombie | 417/467 |
| 2,932,255 | 4/1960 | Neukirch | 417/462 |
| 3,056,356 | 10/1962 | Piper | 417/462 |
| 3,168,050 | 2/1965 | Laing | 91/493 |
| 3,521,533 | 7/1970 | Van Auermete | 91/496 |

FOREIGN PATENTS OR APPLICATIONS

| | | | |
|---|---|---|---|
| 512,352 | 10/1920 | France | 123/44 |
| 44,801 | 5/1916 | Sweden | 123/44 |

Primary Examiner—William L. Freeh
Attorney, Agent, or Firm—Flehr, Hohbach, Test, Albritton & Herbert

[57] ABSTRACT

A rotating piston engine for use as an internal combustion engine, hydraulic motor or pump, air or gas compressor, or vacuum pump and the like. A stator supports a cylindrical rotor bored to receive a double-acting piston journalled on the crank of an eccentric mounted crankshaft. Means are provided to overcome the deadspot occurring when the crank pin is aligned with the rotor axis. Multi-piston forms of the invention are provided, and in one form means are provided to array plural pistons in a common plane. In another form the crank pin itself serves as the piston, and a modification of this provides split crank pins astraddle a second crank pin and with equal effective areas for even fluid flow. In another form the inlet and outlet channels to the cylinders are sized to equalize fluid pressure on the rotor. In another form the rotor is mounted on a cantilever portion of the stator. In another form a floating piston is provided with channels communicating fluid pressure to the crank pin for relieving bearing pressure. In another form, grooves are provided on either side of working ports with rotor passageways communicating these grooves with opposite ports for balancing forces on the rotor. In another form a multi-piston engine includes a plurality of cylinders mounted for radial displacement relative to a rotor for wear compensation, and with the combined action of centrifugal force and fluid pressure assuring a fluid tight seal against the inner surface of the stator. In another form inlet and outlet passageways are provided in the crankshaft with valving communication to the cylinders achieved by relative rotation between the crankshaft and rotor.

13 Claims, 28 Drawing Figures

PATENTED MAR 26 1974

FIG_1  FIG_2  FIG_3  FIG_4

PRIOR ART

FIG_5  FIG_6

FIG_7  FIG_8

INVENTOR.
AUGUST UNO LAMM

BY Flehr, Hohbach, Test,
Albritton & Herbert
ATTORNEYS

FIG_14

FIG_15

FIG_17

FIG_16

INVENTOR.
AUGUST UNO LAMM

BY Flehr, Hohbach, Test, Albritton & Herbert
ATTORNEYS

FIG_25

FIG_26

FIG_27

FIG_28

ROTATING PISTON ENGINE

This is a continuation, of application Ser. No. 878,637 filed Nov. 21, 1969, now abandoned.

BACKGROUND AND OBJECTS OF THE INVENTION

FIGS. 1 – 4 illustrate a prior art rotating piston engine 1 which has been suggested for use as a prime mover, fluid pump or motor, air or gas compressor, or vacuum pump and the like. Engine 1 includes a cylindrical rotor 10 encased in a closed housing or stator 11. The rotor is bored along a diameter to form a double-acting cylinder 12. A double-faced piston 13 is mounted for movement along the major axis of cylinder 12 and is journalled on a crank 14 of crankshaft 15, which in turn is in connection with a driving or driven shaft of the engine. The crankshaft is carried on suitable bearings in stator 11 so that its axis of rotation is parallel with the axis of the rotor, with the distance between the two axis being equal to the throw radius r of the crank.

Rotor 10 will rotate with an even angular velocity when crankshaft 15 is rotated with an even angular velocity double that of the rotor. The piston will move from one end of the cylinder to the other end as the crankshaft completes one revolution and the rotor completes one-half revolution. Total travel for piston 13 during this cycle is equal to 4r.

The double-acting piston engine 1 provides advantages in that the elements of the engine move with purely rotational movement. This simplifies the balancing of the moving parts to avoid objectionable vibrations. However, this type of engine has not been used in practice because of other shortcomings such as an imbalance of the pressure forces on the rotor and other parts, the occurrence of a "deadpoint" when the rotor axis coincides with the crank axis, the limitations in cooling the cylinders when used as an internal combustion engine or compressor, wear between the moving surfaces, and other problems.

Accordingly, it is an object of the invention to provide an improved rotating piston engine of the type described useful as a fluid pump or motor, with the active fluid either a liquid or a gas, as an internal combustion engine, a gas compressor, or vacuum pump and the like.

Another object is to provide an improved rotating piston engine of the type described which overcomes the deadpoint existing when the crank axis coincides with the rotor axis where no torque can be exercised between the two rotating parts and where the rotor can come out of phase in relation to the crankshaft. The present invention provides means for obviating this problem without the requirement of connecting the rotor and crankshaft by an external gear having a ratio of 1:2, as has previously been suggested.

Another object is to achieve a more even flow of fluid to the engine and a more even shaft torque by providing several double-acting cylinders in a common rotor in different angular positions.

Another object is to provide a rotating piston engine of the type described with inlet and outlet ports for the fluid arranged so that the resulting forces on the rotor from the fluid pressure are reduced or eliminated. In engines of the type described where the rotor has a relatively large diameter journalled in a housing, this problem is of particular concern as a result of the high torque from friction.

Another object is to provide a rotating piston engine of the type described with a piston bearing relieved from mechanical forces by directing a part or all of the fluid pressure to act directly on the crank.

Another object is to provide a rotating piston engine of the type described where the crank itself acts as the piston, thereby eliminating any mechanical forces from a piston which otherwise would act on the crank.

SUMMARY OF THE INVENTION

This invention relates to rotating piston engines useful as internal combustion engines, hydraulic pumps or motors, air or gas compressors, or vacuum pumps, and the like.

The invention broadly provides a rotating piston engine incorporating a crank arrangement rotating in a stator and with a rotor journalled about an axis parallel with the crankshaft axis and eccentrically spaced therefrom. The crankpin moves in a transverse cylinder provided in the rotor. In one form a piston mounted on the throw radius and slideable in the cylinder is provided, and in another form the crankpin at the throw radius itself moves in the cylinder and acts as the piston. A cylinder of this arrangement can be easily balanced diametrically, and all remaining elements undergo purely rotational movement which is easily balanced. The inlet and outlet ports and channels can be arranged so that the fluid pressure forces acting on the rotor are balanced to reduce frictional losses.

The deadpoint inherent when the crankthrow axis coincides with the rotor axis is overcome in one form by providing an additional crankpin arranged in a rotor slot at an angle to the cylinder axis, and in other forms by providing a plurality of crank and piston arrangements with rotors interlocked either mechanically or magnetically.

A plurality of cylinders for an engine of the type described can be located on a common plane. In one form of this arrangement side forces resulting from axial displacement of the bearing are eliminated by providing a bifurcated crank straddling another crank, or in another form with a cylinder in a center plane arranged between a pair of split-cylinder and piston assemblies.

Channels are provided in a floating piston in another form for balancing forces on the crank to reduce friction losses. In another form grooves are provided adjacent to inlet and outlet ports for receiving pressurized fluid from an opposite port to balance forces on the rotor.

A multi-piston modification is provided in which a plurality of separate, circumferentially positioned cylinders are adapted to displace outwardly for both wear adjustment and to provide a fluid-tight seal with the stator housing.

In another form the stator body is made smaller and the rotor mounted for movement about a cantilever segment of the stator.

In another form the inlet and outlet ports of the engine are provided in the crankshaft with relative rotation between the crankshaft and rotor providing a valving function.

DESCRIPTION OF THE PREFERRED EMBODIMENTS

Figure 1:
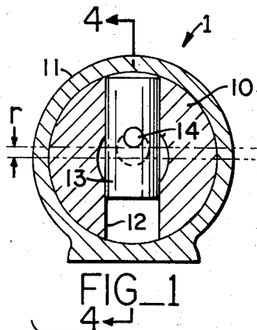
FIG. 1 is a cross-section elevational view illustrating a prior art rotating piston engine with elements thereof in a first operative position.
Figures 2, 3:
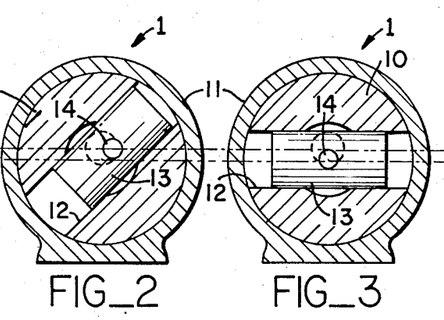
FIG. 2 is a view similar to FIG. 1 illustrating a further operative position of the elements.
FIG. 3 is a view similar to FIG. 1 illustrating a further operative position of the elements.
Figure 4:
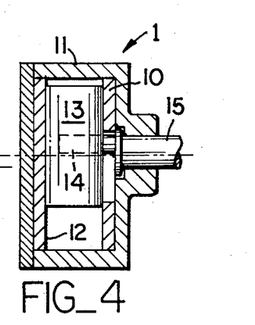
FIG. 4 is an axial section view taken along the line 4—4 of FIG. 1.
Figure 5:
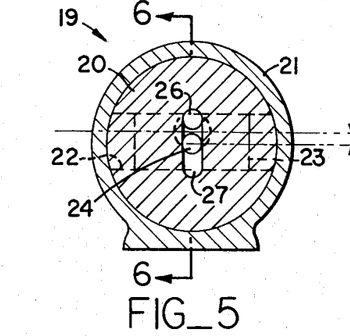
FIG. 5 is a cross section elevational view taken along the line 5—5 of FIG. 6 illustrating a modified form of the invention incorporating features to overcome the "deadpoint" of engine operation.
Figure 6:
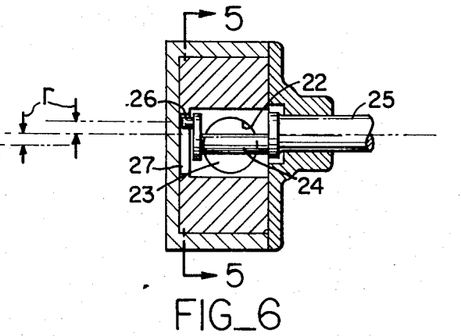
FIG. 6 is an axial section view taken along the line 6—6 of FIG. 5.

Referring to FIGS. 5 and 6 a preferred form of the rotating piston invention is illustrated generally at 19. Engine 19 comprises a rotor 20 mounted for rotation within housing or stator 21. A bore or cylinder 22 is provided in the rotor and a piston 23 is slideably mounted within the cylinder in close-fitting, fluid-tight engagement. In the preferred form the transverse cross-section configuration of the cylinder and piston are shown as circular, although the invention is not so limited and other configurations could be used, such as oval, square, or rectangular and the like. Piston 23 is double-faced and is journalled by suitable bearings on a crank pin or throw 24 of crankshaft 25. The crankshaft in turn is journalled by suitable bearings on stator 21, and is connected to the driving or driven shaft, not shown, to be utilized in the intended application. The axis of crankshaft 25 is parallel with the axis of rotor 20, but spaced therefrom a distance equal to the crank throw radius $r$.

A second crank 26 is provided at the distal end of the crankshaft and has the same throw radius $r$ as that of crank 24. Crank 26 is angularly positioned at 180° from crank 25. A transverse slot 27 is provided in rotor 20 for sliding engagement with crank 26 so that the latter moves along a diameter of the rotor perpendicular to the axis of cylinder 22. With the engine in its deadpoint position in which crank 24 axis is aligned with rotor 20 axis, as illustrated in FIG. 5, crank 26 will act as a driving pin and insure a coupling between the crankshaft and rotor to carry the rotating elements over the deadpoint.

Because the action between crank 26 and slot 27 is needed only at or near the rotor position deadpoints, there is great freedom in the configuration and arrangement of these two elements. Slot 27 thus need not be rectilinear in the rotor but need only contact crank 26 in the region of the deadpoints. Moreover, the angular displacement between cylinder 22 and slot 27 need not be 90°, but should be equal to half the angular displacement between crank 24 and crank 26. However, the 90° displacement between the cylinder and slot, and the 180° displacements between crank 24 and crank 26, are preferred as being the most effective.

The problem of the deadpoints in rotating piston engines of this type can also be overcome by providing a plurality of cranks with associated cylinders and pistons phase displaced about the rotor. In addition, the usual advantages of multi-cylinder engines are achieved, such as more even engine torque and fluid flow. The modified forms of the invention illustrated in FIGS. 7–13 incorporate two cylinder engines effective in overcoming the deadpoint problem.

Figure 7:
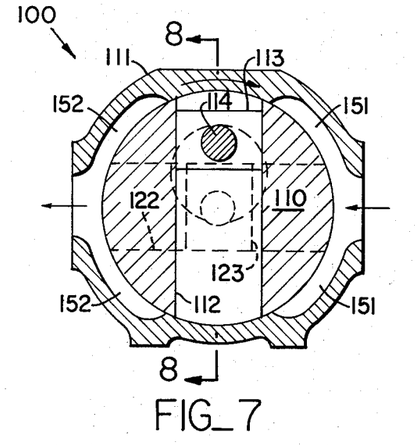
FIG. 7 is a cross-section elevational view of a modified form of the invention incorporating a plurality of pistons and cylinders.
Figure 8:
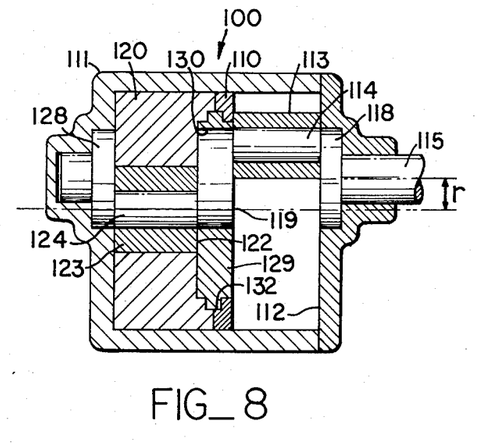
FIG. 8 is an axial section view taken along the line 8—8 of FIG. 7.

Referring to FIGS. 7 and 8 a dual piston engine is illustrated generally at 100 and comprises a pair of rotors 110,120 secured together by suitable means to form one rotating body. A cylinder 112 is formed in rotor 110, and a cylinder 122 is formed in rotor 120 at a position angularly displaced 90° from the longitudinal axis of cylinder 112. Crankshaft 115 is mounted in stator 111 and carries a pair of angularly displaced cranks 114,124, each having a throw radius $r$. A pair of pistons 113,123 are mounted on respective cranks 114, 124 for sliding movement within respective cylinders 112,122.

Stator 111 is provided with inlet and outlet canals or ports 151,152 which serially communicate with a respective cylinder end during each one-half revolution of the rotor. An engine of this type with two double-acting pistons is equivalent in smoothness of flow and torque to a conventional four-cylinder engine. In addition, my invention doubles the number of crankshaft 115 revolutions for the same number of piston strokes as compared to the conventional engine.

The cylinders and pistons of engine 100 are illustrated with a preferred rectangular cross section. Only those walls of the cylinders which are parallel to the rotor axis are formed wholly by the rotor body. The outside walls perpendicular to the rotor axis are formed partially by the stator 111 and partially by the walls of flanges 118,128 of the crankshaft. The opposite, interior walls are formed partially by rotors 110,120, partially by the walls of flange 119 on the crankshaft, and partially by the side walls of a disk 129 mounted on flange 119 through a bore 130 eccentrically located on the disc. Disc 129 in turn is rotably mounted in a recess 132 provided at the interface of rotors 110,120. Because bore 130 is eccentric, disc 129 will remain stationary when the shaft and rotor are rotating. Suitable thrust bearings, not shown, may be provided between the disc and either flange 119, or the rotors 110,120, to absorb the axial forces on the disc resulting from fluid pressure in the cylinders.

The thrust bearings for disc 129 can be eliminated if the rotors 110,120 are spaced apart axially, not shown, and the disc 129 extended radially outwardly through the interface between the rotors to stator 111 and attached thereto by suitable fastening means. With this construction, however, the two rotor parts could not be mechanically interlocked and synchronized with each other, and thus each would have separate deadpoint positions. The present invention obviates this by providing magnetic attraction between rotors 110,112 by means such as suitable magnets, not shown, mounted in the rotors. This would provide a mutual torque to restore the correct relative position of the two rotor parts when they tend to drift apart.

As used herein, the term "rotor" or "one rotor" is intended to also include a rotor combined of two or more separate rotors of the same engine connected to each other, either mechanically or magnetically.

Figures 9, 10, 11:
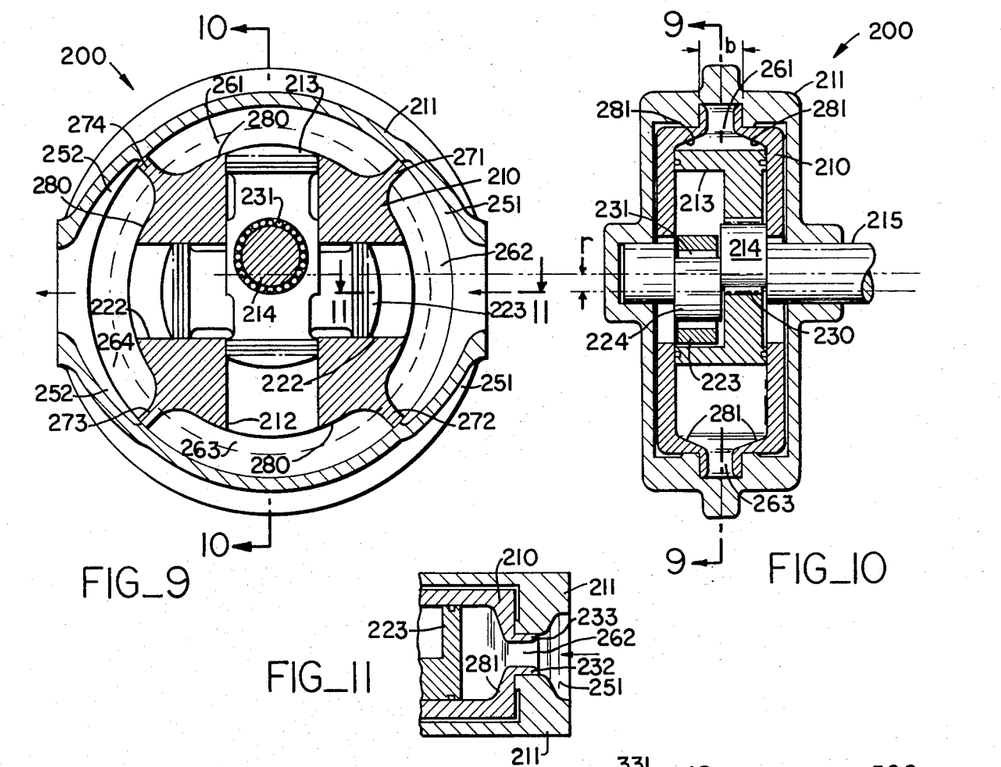
FIG. 9 is a cross-section elevational view taken along the line 9—9 of FIG. 10 illustrating a modified form of the invention incorporating two cylinders in a common plane and with a modified arrangement for the inlet and outlet ports.
FIG. 10 is an axial section view taken along the line 10—10 of FIG. 9.
FIG. 11 is a partial axial section view taken along the line 11—11 of FIG. 9 illustrating the intake opening arrangement.

Referring to FIGS. 9–11 a modified form of the piston engine illustrated generally at 200 incorporates a plurality of cylinders 212,222 positioned in the same transverse plane of rotor 210, which in turn is rotatably mounted within stator 211. Each cylinder is provided with a respective piston 213,223 journalled by suitable bearings 230,231 on respective cranks 214, 224 of crankshaft 215. The cylinders are angularly positioned 90° apart and the cranks are angularly positioned 180° apart. Also, the throw radius $r$ is identical for the two cranks 214,224 and equal to the eccentricity of the rotor with respect to the rotational axis of crankshaft 215.

The bearings 230,231 mounting the pistons on the cranks are illustrated as preferred roller or needle bearings, with the needles being inserted after the pistons had been mounted on the cranks.

While it is one characteristic of the eccentric crank type of rotary piston engine to have no side forces between piston and cylinder, the form of FIGS. 9–10 will produce some side forces due to the axial displacement of the bearings relative to the center of the piston. This problem is obviated by providing one crank and associated bearing, not shown, in the axial center of the engine and with the other crank, not shown, bifurcated with a leg on either side of the first crank. The bearing sleeves of the bifurcated crank legs would then be connected to their associated piston head on either side of the central piston.

Figure 12:
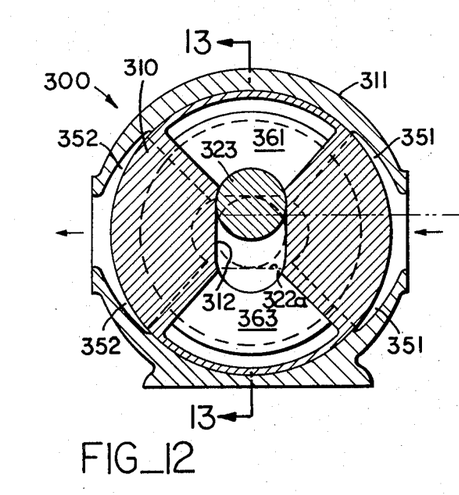
FIG. 12 is a cross section elevational view taken along the line 12—12 of FIG. 13 showing a modified form embodying the crank surfaces as the pistons.
Figure 13:
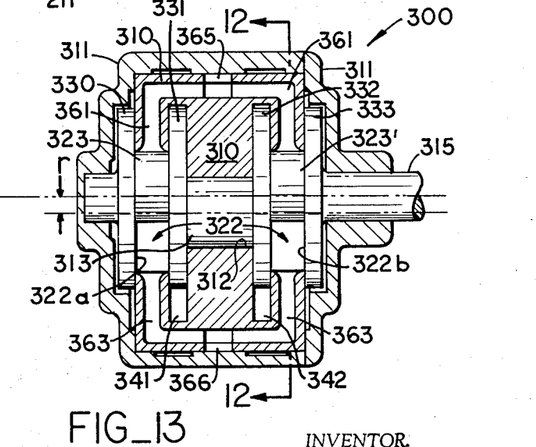
FIG. 13 is an axial section view taken along the line 13—13 of FIG. 12 illustrating split cylinders to achieve balanced forces.

Alternatively, one complete cylinder together with associated piston and crank can be located in the center plane while the other cylinder and associated piston and crank is divided into two assemblies symmetrically located on either side of the first piston, as illustrated by engine 300 in FIGS. 12–13.

In the modifications heretofore described the stator has taken the form of a housing or casing enclosing the rotor. This housing provides the side walls of the cylinders in the embodiments of FIGS. 7–8 and 16–17, while the rotor forms only the two end walls parallel to the rotor axis.

Figures 14, 15:
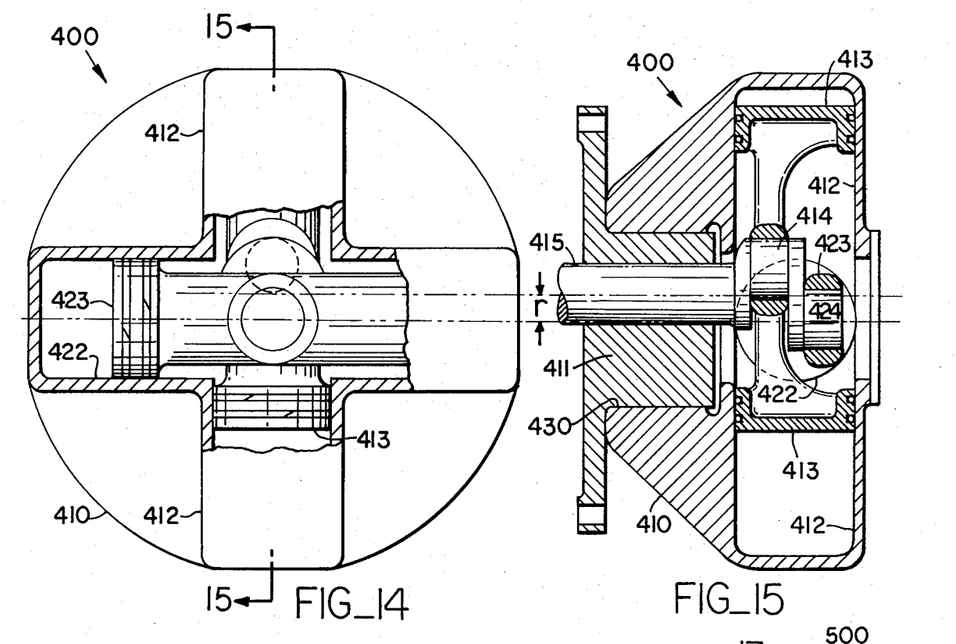
FIG. 14 is a partial cross-section elevational view of a modified form in which the rotor containing the cylinders is located outside the stator.
FIG. 15 is an axial section view taken along the line 15—15 of FIG. 14.
Figure 16:
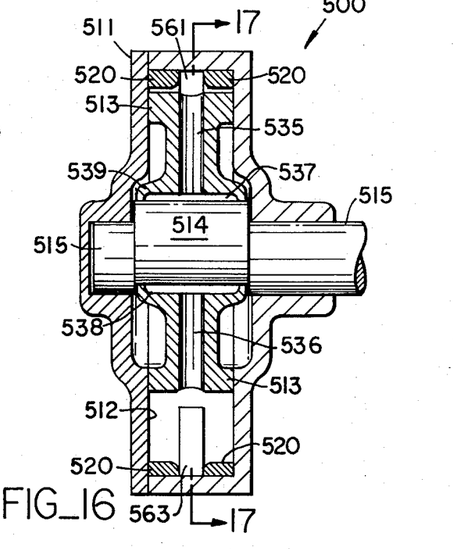
FIG. 16 is an axial section view of a modified form adapted to relieve the loads on the piston-to-crank bearing.
Figure 17:
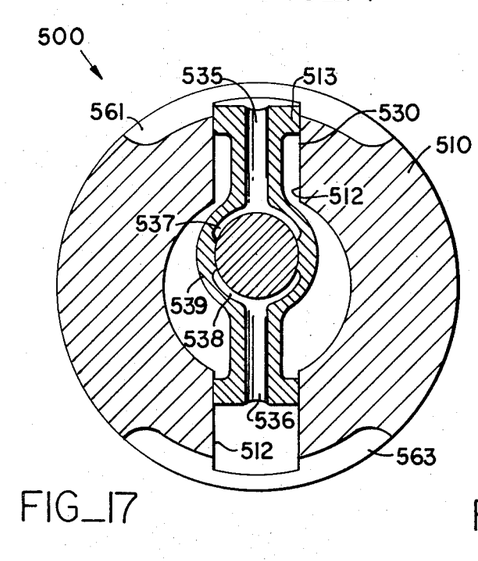
FIG. 17 is a cross-section elevational view taken along the line 17—17 of FIG. 16.
Figures 18, 20:
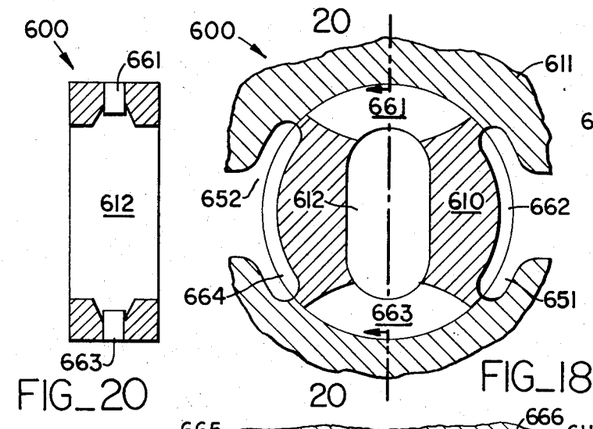
FIG. 18 is a cross-section view taken along the line 18—18 of FIG. 21 illustrating a modified form in which radial forces on the rotor resulting from fluid pressure are reduced or eliminated.
FIG. 20 is an axial section view taken along the line 20—20 of FIG. 18.
Figure 19:
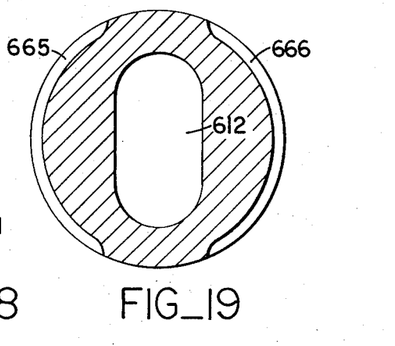
FIG. 19 is a cross-section view taken along the line 19—19 of FIG. 21.

In the modification of FIGS. 14–15, a rotating piston engine 400 is provided comprising a stator 411 adapted to support the remaining engine components located outside the stator. Thus, rotor 410 is mounted on a cantilever segment of the stator and includes cylinders 412,422 slideably receiving respective pistons 413,423. Rotor 410 is journalled by suitable bearing means, not shown, eccentrically on the outside of the stator body. Crankshaft 415 is journalled by suitable bearing means, not shown, within a bore 430 provided within the stator and eccentrically displaced by throw radius $r$ from the rotor axis. Crankshaft 415 includes a pair of cranks 414 and 424 formed on the distal end of the crankshaft and mounted in driving engagement with pistons 413,423. Rotary piston engine 400 thereby provides a smaller stator body, and affords simplified air-cooling of the cylinders for applications such as an internal combustion engine or compressor, and the like.

The inlet and outlet port arrangements for the modification of FIGS. 14–15 can be similar to the previously described modifications; thus, openings, not shown, in the cylindrical part of stator 411 facing the rotor may be provided to serially communicate with suitable openings, not shown, in the rotor which in turn communicate with the cylinder ends. Alternatively, separate valves, not shown, may be arranged for each cylinder and operated by suitable cam means moving relative to the non-rotating stator.

The modification of FIGS. 7–8 provides means for reducing the forces on the rotor produced by the pressure of the working fluid. When cylinder 112 of engine 100 is open towards the closed segment of housing at either end, as illustrated in FIG. 7, the cylinder pressure itself did not produce any radial force on the rotor. In this engine position a radial force is generated only on the piston and inner wall of the housing, which force is therefore balanced out. However, when a pressure difference exists between the fluid in the inlet and outlet ports or canals 151,152 in the stator, this difference will exercise a radial force on the rotor. The resulting force is a function both of the difference between the pressure between the inlet and outlet ports, and of the angular position of the rotor. The resultant imbalance in the force will cause friction losses and abrasion wear between rotor and stator, between which suitable antifriction bearings, not shown, would normally be required.

The modified engine 200 of FIGS. 9–11 provides means to reduce or eliminate these frictional forces, with a two cylinder engine illustrated as an example. The outer end of each cylinder is provided with end segments 281 defining ports or channels 261, 262, 263, 264 extending symmetrically along a periphery of the rotor each with a length corresponding to approximately one-fourth of the rotor circumference. The ports 261–264 are separated by four circumferentially spaced transverse walls 271–274. The projected area of each such port at the periphery of the rotor is preferably equal to the cross section area of a respective cylinder.

Corresponding inlet and outlet ports or canals 251, 252 are provided in stator 211 at diametrically opposite positions, and each such port extends over one-fourth of the stator circumference. The stator ports face the ports of the rotor, as best seen in FIG. 11. In the preferred embodiment the outer edges or flanges 232 of end segments 281 are spaced apart to form the rotor ports, and these flanges rotate in an annular groove 233 defining the active width $b$ of the stator ports. With the projected length of the rotor ports being $L$, the product $b \times L$ preferably equals the cross sectional area of each cylinder. As long as this condition is complied with, there will be no substantial resulting radial force on the rotor from the static fluid pressure. Centripetal force on the bottom 280 of the rotor ports outside the cylinder will be balanced by centrifugal force on the cylinder 281 where this is not open towards a respective port.

Generally, in an engine of this type with $n$ double-acting cylinders, the inlet and outlet ports of the rotor should extend over approximately ½$n$ of the circumference of the rotor, and the corresponding ports of the stator should extend over approximately (½ − ½$n$) of its circumference. Each cylinder end will then communicate with each opening of the stator during one-half revolution of the rotor, i.e., during one stroke of the piston. This formula has particular application to hydraulic pumps and motors utilizing an incompressible fluid. Where gas is the active fluid, the length of the ports may be smaller and the remaining non-port segments of rotor revolution larger.

While the foregoing formula for inlet and outlet ports has been described in relation to FIGS. 9–11, these formulas have equal application to the modifications of FIGS. 12–13 and FIGS. 22–24, as an example.

In the modification of FIGS. 12–13 a rotary piston engine 300 comprises a rotor 310 formed with two perpendicular cylinders 312, 322. Cylinder 322 comprises two axially spaced parallel-acting half cylinders 322a, 322b, astraddle centrally positioned cylinder 312. Each half cylinder is formed with a cross-sectional effective area one-half that of cylinder 312. A crankshaft 315 rotatably mounted within the stator 311 is provided with a central crank 313 which acts as a piston itself and is slideably received in cylinder 312, and a pair of axially spaced cranks 323, 323' which act as pistons themselves and are slideably received in respective cylinders 322a, 322b. The sides of the slots in the rotor define two opposite walls for respective cylinders while the remaining cylinder walls are defined by the crankshaft flanges 330, 331, 332 and 333. Flanges 331 and 332 fit in annular recesses 341 and 342 provided in dismountable rotor 310. Because of the eccentricity between the rotor and crankshaft, these recesses must have a larger diameter than their associated flanges.

Inlet and outlet ports for all cylinder ends are aligned in the central plane of the rotor. The two outer cylinders 322a, 322b thus communicate with flange channels 361, 363 extending radially from the cylinder ends and joined at the rotor mid-plane for connection with grooves 365, 366 opening towards the stator. With the two outer cylinders in parallel fluid connection, each cylinder end thus occupies one-fourth of the circumferential area of the analagous channels 261–264 of FIG. 9.

The symmetry of the cylinder system and the central location of its communication with the stator inlet and outlet ports 351 and 352 results in a balance of the forces on the rotor. It will likewise be seen that the same balancing of the forces is attained in the three cylinder engine shown in FIGS. 22–24.

In an engine having only one cylinder, however, it is difficult to remove the pressure forces from the rotor by the foregoing method. The formulas given above would dictate a length of each rotor groove of 180°, and each stator groove 0°. The openings in the stator would thus have to be very short and, because their width $b$ is determined by the width of the rotor grooves, so narrow that the flow would be unacceptably restricted. The modification of FIGS. 18–21 illustrate such a single cylinder engine 600 in which the forces are balanced out. Engine 600 comprises a rotor 610 rotatably mounted in stator 611, and with a cylinder 612 for receiving the piston of the previously described crankshaft arrangement, not shown. Openings or grooves 661 and 663 provided in rotor 610, and grooves 651, 652 provided in stator 611, correspond to the grooves of FIGS. 9–11 and have the same last two digits in their designations. Where the stator grooves 651, 652 do not face any active grooves in the rotor, fluid pressure therein will exert forces which must be balanced out. For this purpose, a pair of inactive grooves 662, 664 are provided in the rotor along the remaining two quarters of its circumference. These grooves communicate through a plurality of diagonal passageways 663, shown schematically in FIG. 21, with two pairs of outer grooves 665, 666 located on opposite sides of the rotor and on either side of the center grooves at a position where there is no facing stator groove. The combined projected area of outer grooves 665, 666 is equal to that of grooves 662, 664, respectively, whereby radial forces developed by fluid in the grooves are balanced out.

While elongated openings in the rotor and stator are illustrated as preferred, a plurality of shorter openings or holes, not shown, may similarly be provided. The openings would be fluidly connected in parallel and dimensioned in accordance with the foregoing considerations to balance out the pressure forces.

Still another method of balancing the rotor in respect of fluid pressure forces is to leave the cylinder open towards the cylindrical inside of the stator housing, as in FIGS. 1–4, and to position the inlet and outlet openings, not shown, in the axial sides of rotor 12 with corresponding openings in the facing walls of housing 11. By arranging these openings symmetrically on both sides the pressure forces are balanced out.

Elimination of the pressure forces on the rotor will make it feasible to eliminate separate bearings between the rotor and stator. Similarly, the requirement for a bearing between the piston and crank can also be reduced or eliminated. Thus, in the modification of FIG. 16–17 a rotary piston engine 500 is provided comprising a floating piston 513 slideably mounted in cylinder 512 of rotor 510. A crankshaft 515 mounted in stator 511 is formed with a crank 514 carrying the piston. The piston is formed with longitudinal channels 535,536 providing communication between the piston faces and relieved cavity or hollows 537,538 of a bearing sleeve 539 mounted on the crank. The fluid pressure developed in the engine is directed to the surface of the crank itself, thereby relieving the piston bearing from pressure loads. Where the projected area of each cavity 537,538 facing the crank is equal to the cross section area of the piston, the bearing is completely relieved from any static pressure force acting on the piston. The radial forces on the piston heads would be balanced by the outward pressure on the walls of cavities 537,538. The two halves of the rotor are mounted together by four arcuate beam-shaped members 520 on each side of the inlet/outlet ports 561,563 in the rotor. An extreme application of the foregoing means of relieving piston bearing pressures is the modification of FIGS. 12-13 where the crank itself serves as a piston with the fluid pressure acting directly on the crank.

Figures 21, 22, 23, 24:
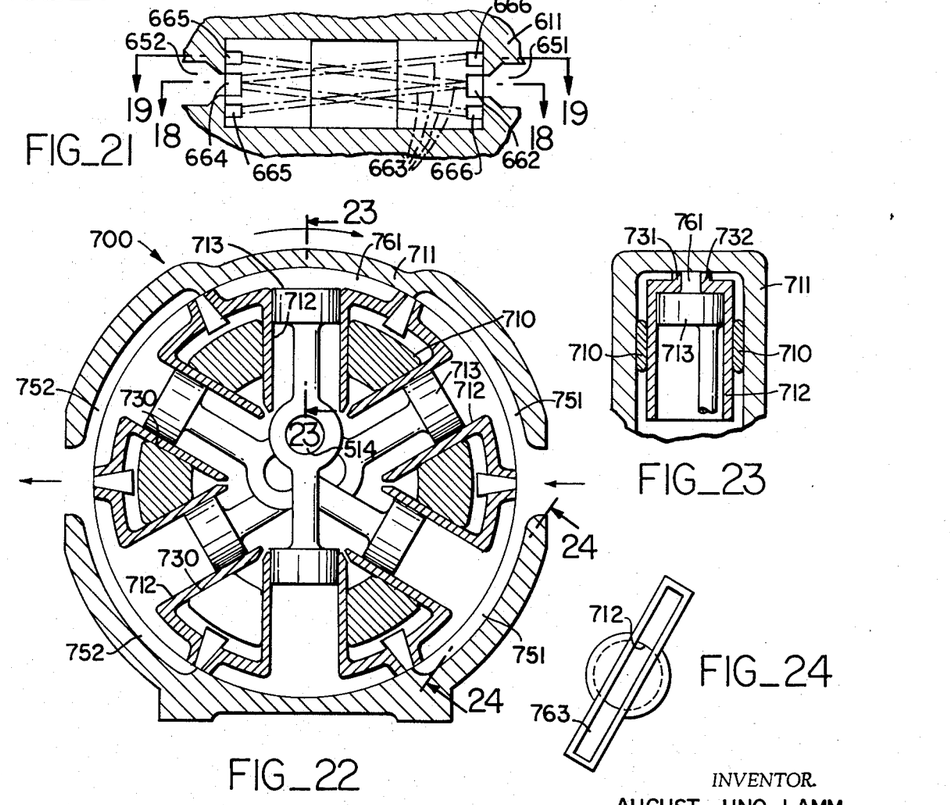
FIG. 21 is a partially schematic, axial section of the modified engine of FIGS. 18–20.
FIG. 22 is a cross-section elevational view of a modified form with three double-acting cylinders adapted to displace radially.
FIG. 23 is a partial axial section taken along the line 23—23 of FIG. 22.
FIG. 24 is a partial side view taken along the line 24—24 of FIG. 22 illustrating the intake/outlet port of one cylinder.

A modified form of the invention illustrated in FIGS. 23–24 includes a rotary piston engine 700 with three cylinders. The rotor comprises an annular member 710 with six radial bores 730 adapted to receive six cylinder members 712, each mounted with a degree of radial sliding movement with respect to the rotor. Each opposite pair of cylinder members define a cylinder for receiving a respective piston 713. Each piston in turn is mounted on a respective crank of crankshaft 514. As illustrated in FIG. 23 the outer rims 731,732 of each cylinder are spaced apart to define openings 761 serving as inlet/outlet ports successively facing and communicating with grooves 751,752 provided in stator 711. The projected area of cylinder openings 761 is dimensioned in relation to the cross sectional area of the cylinders so that the resulting outward pressure force on the cylinders, combined with the centrifugal force induced by rotation, provides adequate pressure against the stator inner surface to achieve a fluid-tight seal along the ports. With the cylinder members adapted to displace radially outwardly, this seal can be maintained even as the contacting surfaces are worn.

When a multi-cylinder machine is used as an internal combustion engine, one of the cylinders can be arranged to extract a fuel/gas mixture from an intake manifold, not shown, compresses the mixture, and feed it to another cylinder for combustion. With the other cylinder operating in a two-stroke mode, a two-cylinder engine, e.g., arranged similarly to FIGS. 7–8 or 14–15, will then have one ignition per crankshaft revolution.

A similar two-cylinder engine using both of the double-acting cylinders for combustion in a four-stroke mode would also have an average of one ignition per crankshaft revolution. However, the ignitions would not follow each other in equal sequence. The desired equal ignition sequence can be achieved with the present invention by having two cylinders in the rotor parallel to each other. With their associated cranks coaxial the two pistons would move conjointly, and for every revolution of the crankshaft alternate pistons would undergo ignition so that the ignitions would follow one another in equal relationship. The crankshaft system, however, would then not be balanced. To achieve dynamic balance, additional cylinders, not shown, are arranged perpendicularly to each of the parallel cylinders. The cranks for the pistons of the additional cylinders are angularly positioned 180° from the first two cranks, thereby achieving balance of a four-cylinder system.

A two cylinder engine of the type described can also be balanced by locating each cylinder in separate, side-by-side rotors and with parallel axes of cylinder rotation. The distance between the axes is 2$r$, where $r$ is the crank throw radius. The common crankshaft for the two cranks of throw radius $r$ has its axis of rotation at the mid point between the axes of the two rotors. Thus, each rotor system would operate in accordance with the principle of the invention, and the pistons would turn simultaneously. Used as a four-stroke combustion engine, the ignitions of this engine would thus follow each other in serial timed relationship.

The modified forms of the invention illustrated in FIGS. 25–26 and 27–28 arrange the inlet and outlet ports for the engine through the crankshaft, and associated elements, instead of directly through the stator. The periodic opening and closing of the ports for valving is achieved by the relative rotation between crankshaft and the rotor. This relative rotation is equal to the angular velocity between rotor and stator and therefore the same correlation can be obtained for valving functions in relation to piston movement.

To clarify the illustrations of FIGS. 25-28 the axial sections are taken along a plane tilted at 45° from the central axes 840,841 disposed vertically in the previous embodiments.

In FIGS. 25–28 engine elements corresponding to those of the previous embodiments are identified by numerals with the last two digits identical.

Figure 25:
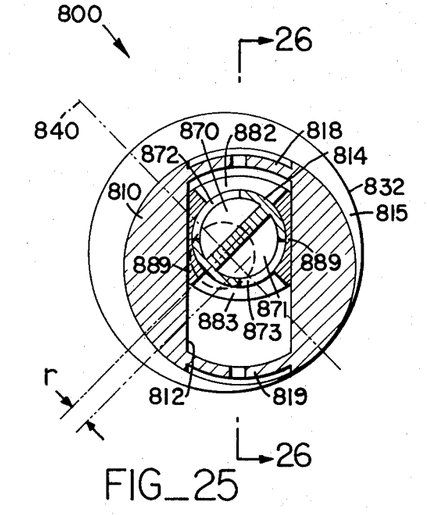
FIG. 25 is a cross-section elevational view taken along the line 25—25 of FIG. 26 showing a modified form with both intake and outlet openings through the piston crank and crankshaft.
Figure 26:
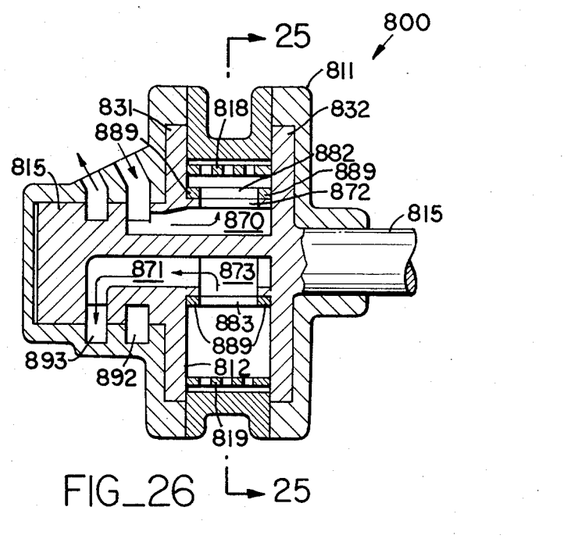
FIG. 26 is an axial section view taken along the line 26—26 of FIG. 25.
Figure 27:
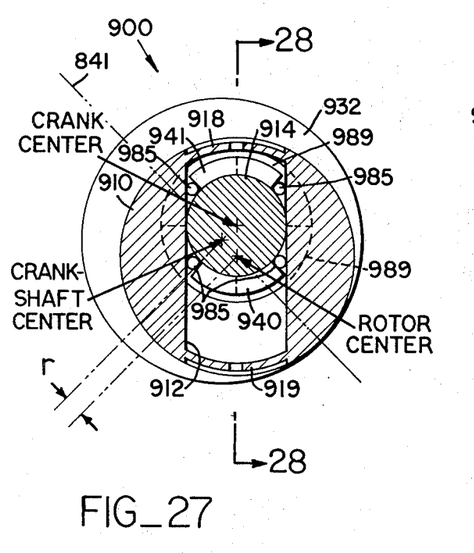
FIG. 27 is a cross-section elevational view taken along the line 27—27 of FIG. 28 showing a modified form with both intake and outlet openings through flanges on the crankshaft.
Figure 28:
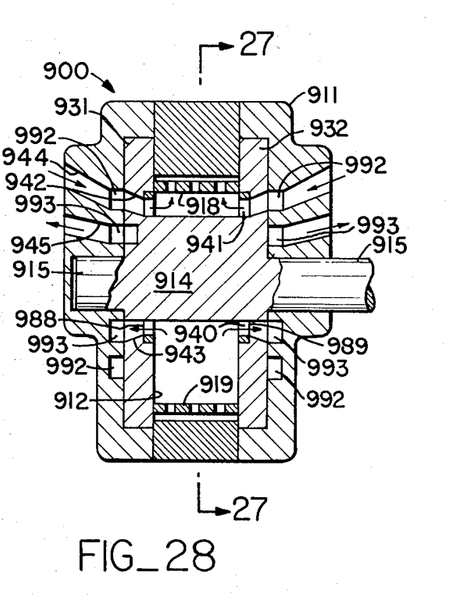
FIG. 28 is an axial section view taken along the line 28—28 of FIG. 27.

The modification of FIG. 25–26 provides an engine 800, while the modification of FIGS. 27–28 provides an engine 900, both engines incorporating a design with the crank itself comprising the pistons carried between flanges of the crankshaft.

Engine 800 comprises a stator 811 mounting crankshaft 815 which in turn includes a pair of axially spaced flanges 831, 832 together defining the end walls of cylinder 812. Rotor 810 comprises two diametral segments defining the side walls of cylinder 812, which has a rectangular cross section. The segments are connected together with two perforated arcuate bars 818,819. The gap between the bars and stator has the same cross section area as the adjacent cylinders so that radial fluid forces are projected on the inside surface of the stator and not on the rotor.

The distal end of crankshaft 815 is provided with an axial intake passageway 870 and an axial outlet passageway 871. The passageways have respective crank openings 872,873 facing outwardly and extending over one fourth of the crankshaft circumference. A rotary slide valve 889 is mounted on crank 814 and is provided with diametral openings 882,883 which cooperate with the crank openings 872,873 for inlet and outlet valving to the cylinder chambers on either side of the piston. Valve 889 follows the rotor through its rotation and at the same time provides a seal between the crank or piston 814 and the cylinder walls of the rotor.

Engine 900 of FIGS. 27-28 comprises a stator 911 mounting a crankshaft 915 with the integral flanges 931,932 spaced to define cylinder walls 912. A rotor 910 is mounted between the flanges and comprises two spaced segments defining the side walls of cylinder 912, which has a rectangular cross section. The rotor segments are connected together with perforated arcuate bars 918,919. The cross section area of the gap between the bars and stator is equal to that of the cylinder so that the radial fluid pressure is projected on the stator inside surface and not on the rotor.

The inlet and outlet openings for communicating fluid to engine 900 is through the sides of the cylinders. Washers 988,989 are set in recesses formed in crank flanges 931,932, and are provided with openings 940,941. The washer openings in turn interact with inlet and outlet openings 942,943 formed in the crank flanges. Pins 985 are provided to secure the washers for rotating movement with rotor 910, as illustrated in FIG. 27. Pins 985 also function to connect the two washers together and absorb the pressure forces on the washers.

The stator is provided with annular grooves 992,993 facing respective openings 942,943 in the crank flanges. Ports 944,945 in the stator communicate with grooves 992,993 for directing fluid to and from the cylinders.

Where the inlet and outlet fluid passageways are through the crankshaft assembly, as described, it can be advantageous to shift the relative rotating relationship between the engine elements. Thus, what has been called the crankshaft assembly could be the fixed non-rotating part with the inlet and outlet ports connected directly to outside fluid lines. The element which has been designated the stator would then be connected to the engine drive shaft and the axis to this drive shaft coinciding with the fixed crankshaft and extending from the opposite side of the engine. However, because of the eccentricity of the engine, the resulting rotating assembly would then be unbalanced. The dynamic balance could be improved by having two rotors, not shown, axially displaced in relation to each other and with parallel axes of rotation spaced apart a distance $r$, where $r$ is the crank throw radius. A common crankshaft, which would be fixed, having two cranks with throw radius $r$ would be mounted with its axis of rotation in the middle between these two rotors.

While the embodiments herein are considered to be preferred, it is understood that numerous variations and modifications therein may be made by those skilled in the art within the spirit and scope of the invention as expressed in the appended claims.

I claim:

1. A rotating piston engine comprising the combination of: a stator; a rotor mounted in the stator for rotation about a first axis; a cylinder in the rotor having its longitudinal axis perpendicular to said first axis; a crankshaft having a crank with a given throw radius, the crankshaft mounted in the stator for rotation about a second axis parallel with the first axis and spaced therefrom a distance equal to the throw radius; piston means associated with the crank and mounted for movement in said cylinder along its longitudinal axis; inlet and outlet ports in the stator for directing fluid to and from the engine; means forming first openings at the periphery of the rotor communicating with each end of the cylinder and having an effective plane projected area equal to the cross sectional area of its associated cylinder with its geometric center of gravity located adjacent to the cylinder axis; further openings in the rotor located so as to periodically communicate with said inlet and outlet ports in the stator, said first and further openings together providing communication between said cylinder end and said inlet and outlet ports in the stator substantially throughout rotation of the rotor and being located to relieve the rotor from forces from the pressure of the fluid in the cylinder as well as in the inlet and outlet ports of the stator during engine operation.

2. A piston engine as in claim 1 and further characterized in that said further openings in the rotor are positioned in end walls of the rotor and are connected to each cylinder end; and the inlet and outlet ports in the stator are positioned for registry with respective rotor openings whereby fluid pressure on the opposite rotor sides is balanced.

3. A piston engine as in claim 1 and further characterized in that said openings in the rotor comprise a plurality of openings connected in parallel fluid communication.

4. A piston engine as in claim 1 and further characterized in that said means forming first openings at the periphery of the rotor define openings which are identical with said further openings in the rotor and are shaped as elongated passageways along the circumference of the rotor.

5. A piston engine as in claim 1 and further characterized in that said first openings of the rotor are shaped as elongated passageways along the circumference of the rotor and said further openings in the rotor form separate passageways along the same circumference of the rotor between said first openings, said inlet and outlet ports of the stator being positioned along the same circumference for registry with the rotor passageways; and means communicating each of said further openings in the rotor with openings located at the opposite side of the rotor periphery and axially spaced-apart from said circumference.

6. A piston engine as in claim 1 having one or more further cylinders angularly spaced apart symmetrically from said first mentioned cylinder, said first openings of the rotor being shaped as elongated passageways along the circumference of the rotor, each of said further openings of the rotor communicating with each end of said further cylinders and forming separate passageways along the same circumference of the rotor, each such passageway extending over approximately ½$n$ of said circumference where $n$ is the number of cylinders of the rotor, said inlet and outlet ports of the stator being positioned along the same circumference for successive registry with said rotor passageways during rotation of the rotor.

7. A piston engine as in claim 6 and further characterized in that said inlet and outlet ports of the stator extend over approximately (½ − ½$n$) of the stator circumference.

8. A piston engine as in claim 7 having two or more axially spaced-apart cylinders in the same rotor in different angular positions, and further characterized in that said passageways of several cylinder ends are aligned along the same circumference of the rotor.

9. A piston engine as in claim 8 and further characterized in that at least one of the cylinders is divided into two coangular half-cylinders each having equal cross sectional areas and being located symmetrically to the center cross section of the rotor to provide a balance of pressure forces acting on the rotor.

10. A rotating piston engine comprising the combination of: a stator; a rotor mounted in the stator for rotation about a first axis; means forming at least two cylinders in the rotor having their longitudinal axes disposed perpendicular to said first axis and being equally spaced-apart in an angular sense; a crankshaft having the same number of cranks as the number of said cylinders and with said cranks being sized with equal throw radii and being equally spaced-apart in an angular sense, said crankshaft being mounted in the stator for rotation about a second axis parallel with the first axis and spaced therefrom a distance equal to said throw radii; piston means associated with said cranks and mounted for movement in said cylinders along their longitudinal axes, said cylinders and piston means having substantially rectangular cross sections; each cylinder including pairs of spaced-apart sidewalls lying in planes extending transversely of the engine, at least one pair of said cylinder sidewalls which represent opposite sides of coangular cylinder positions being formed by engine elements other than the rotor to maintain a balance of axial pressure forces on the rotor.

11. A piston engine as in claim 10 and further characterized in that at least one of said cylinders is formed into two coangular half-cylinders each having equal cross sectional areas and being located symmetrically to the center cross section of said rotor, said one pair of cylinder sidewalls comprising a sidewall formed by one of said half-cylinders together with a sidewall formed by the other of said half-cylinders.

12. A piston engine as in claim 10 and further characterized in that said other engine elements comprise elements of said stator.

13. A piston engine as in claim 10 and further characterized in that said other engine elements comprise means forming flanges on said crankshafts.

* * * * *